(12) United States Patent
Kumar et al.

(10) Patent No.: US 11,716,643 B2
(45) Date of Patent: Aug. 1, 2023

(54) USER EQUIPMENT-BASED LINK ADAPTATION FOR 5G NEW RADIO

(71) Applicant: QUALCOMM Incorporated, San Diego, CA (US)

(72) Inventors: Akash Kumar, Hyderabad (IN); Sumitkumar Shrikant Dubey, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/350,935

(22) Filed: Jun. 17, 2021

(65) Prior Publication Data

US 2022/0408286 A1 Dec. 22, 2022

(51) Int. Cl.
*H04W 24/08* (2009.01)
*H04W 52/14* (2009.01)

(52) U.S. Cl.
CPC ......... *H04W 24/08* (2013.01); *H04W 52/146* (2013.01)

(58) Field of Classification Search
CPC ... H04W 24/08; H04W 52/146; H04W 52/10; H04W 52/241; H04W 52/362; H04W 52/367
See application file for complete search history.

(56) References Cited

U.S. PATENT DOCUMENTS

| | | | |
|---|---|---|---|
| 9,674,789 B1 * | 6/2017 | Govindswamy .... | H04W 52/228 |
| 2002/0168994 A1 * | 11/2002 | Terry .................... | H04W 52/26 455/69 |

(Continued)

OTHER PUBLICATIONS

3GPP TS 38.213: "3rd Generation Partnership Project, Technical Specification Group Radio Access Network, NR, Physical Layer Procedures for control (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, XP052000308, pp. 1-183.

(Continued)

*Primary Examiner* — Steven H Nguyen
(74) *Attorney, Agent, or Firm* — Shumaker & Sieffert, P. A.

(57) ABSTRACT

Example aspects include a method, apparatus, and computer-readable medium for wireless communication at user equipment (UE) of a mobile network, comprising monitoring an uplink metric of an uplink transmission channel. The aspects further include calculating an uplink transmit power based at least on a tolerance threshold. Additionally, the aspects include transmitting, via the uplink transmission channel according to the uplink transmit power, an uplink transmission. Additionally, the aspects include detecting a change in the uplink metric. Additionally, the aspects include comparing the change in the uplink metric with performance improvement criteria. Additionally, the aspects include determining whether to adjust the uplink transmit power. Additionally, the aspects include iterating adjustments to the uplink transmit power. Additionally, the aspects include stopping the adjustments to the uplink transmit power in response to determining that the uplink metric meets a performance threshold or in response to determining that the tolerance threshold has been met.

30 Claims, 6 Drawing Sheets

(56) References Cited

U.S. PATENT DOCUMENTS

| | | | | |
|---|---|---|---|---|
| 2011/0051609 A1* | 3/2011 | Ishii | ...................... | H04B 1/707 |
| | | | | 370/252 |
| 2011/0280210 A1* | 11/2011 | Zhang | ................. | H04W 52/248 |
| | | | | 370/329 |
| 2013/0035084 A1* | 2/2013 | Song | .................... | H04W 52/48 |
| | | | | 455/418 |

OTHER PUBLICATIONS

3GPP TS 38.321: "3rd Generation Partnership Project, Technical Specification Group Radio Access Network, NR, Medium Access Control (MAC) Protocol Specification (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V16.4.0, Mar. 29, 2021, pp. 1-156, XP052000122.

"3rd Generation Partnership Project, Technical Specification Group Radio Access Network, NR, User Equipment (UE) radio transmission and reception, Part 1: Range 1 Standalone (Release 17)", 3GPP Standard Technical Specification, 3GPP TS 38.101-1, 3rd Generation Partnership Project (3GPP), Mobile Competence Centre, 650, Route Des Lucioles, F-06921 Sophia-Antipolis Cedex, France, vol. RAN WG4, No. V17.1.0, Apr. 13, 2021 (Apr. 13, 2021), pp. 1-512, XP052000839.

International Search Report and Written Opinion—PCT/US2022/072386—ISA/EPO—dated Sep. 8, 2022, 18 Pages.

\* cited by examiner

USER EQUIPMENT-BASED LINK ADAPTATION FOR 5G NEW RADIO

BACKGROUND

Technical Field

The described aspects relate generally to wireless communication systems, and more particularly, to apparatuses and methods for user equipment (UE)-based link adaptation for 5G New Radio (NR).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication systems may perform transmit power control (TPC) procedures, such as closed loop power control (CLPC) and open loop power control (OLPC), which may allow for control of a transmit power level of a user equipment (UE) according to wireless channel conditions. However, a UE utilizing OLPC to control transmit power levels may be unable to accurately determine the transmit power levels, which may reduce wireless communication systems from mitigating performance degradations due to changing wireless channel conditions. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

An example aspect includes a method of wireless communication at a UE of a mobile network, comprising monitoring an uplink metric of an uplink transmission channel. The method further includes calculating an uplink transmit power based at least on a tolerance threshold. Additionally, the method further includes transmitting, via the uplink transmission channel according to the uplink transmit power, an uplink transmission. Additionally, the method further includes detecting a change in the uplink metric in response to transmitting the uplink transmission. Additionally, the method further includes comparing the change in the uplink metric with performance improvement criteria. Additionally, the method further includes determining, according to the comparing the change in the uplink metric with the performance improvement criteria, whether to adjust the uplink transmit power. Additionally, the method further includes iterating adjustments to the uplink transmit power in response to determining to adjust the uplink transmit power. Additionally, the method further includes stopping the adjustments to the uplink transmit power in response to determining that the uplink metric meets a performance threshold or in response to determining that the tolerance threshold has been met.

Another example aspect includes an apparatus of wireless communication at a UE of a mobile network, comprising a memory comprising instructions, and a processor communicatively coupled with the memory. The processor is configured to execute the instructions to monitor an uplink metric of an uplink transmission channel. The processor is further configured to calculate an uplink transmit power based at least on a tolerance threshold. Additionally, the processor is further configured to transmit, via the uplink transmission channel according to the uplink transmit power, an uplink transmission. Additionally, the processor is further configured to detect a change in the uplink metric in response to transmitting the uplink transmission. Additionally, the processor is further configured to compare the change in the uplink metric with performance improvement criteria. Additionally, the processor is further configured to determine, according to the comparing the change in the uplink metric with the performance improvement criteria, whether to adjust the uplink transmit power. Additionally, the processor is further configured to iterate adjustments to the uplink transmit power in response to determining to adjust the uplink transmit power. Additionally, the processor is further configured to stop the adjustments to the uplink transmit power in response to a determination that the uplink metric meets a performance threshold.

Another example aspect includes an apparatus of wireless communication at a UE of a mobile network, comprising means for monitoring an uplink metric of an uplink transmission channel. The apparatus further includes means for calculating an uplink transmit power based at least on a tolerance threshold. Additionally, the apparatus further includes means for transmitting, via the uplink transmission channel according to the uplink transmit power, an uplink transmission. Additionally, the apparatus further includes means for detecting a change in the uplink metric in response to transmitting the uplink transmission. Additionally, the apparatus further includes means for comparing the change in the uplink metric with performance improvement criteria. Additionally, the apparatus further includes means for determining, according to the comparing the change in the uplink metric with the performance improvement criteria, whether to adjust the uplink transmit power. Additionally, the apparatus further includes means for iterating adjustments to the uplink transmit power in response to determining to adjust the uplink transmit power. Additionally, the apparatus further includes means for stopping the adjustments to the uplink transmit power in response to determining that the uplink metric meets a performance threshold or in response to determining that the tolerance threshold has been met.

Another example aspect includes a computer-readable medium (e.g., non-transitory computer-readable medium) storing instructions of wireless communication at a UE of a mobile network, executable by a processor to monitor an uplink metric of an uplink transmission channel. The instructions are further executable to calculate an uplink transmit power based at least on a tolerance threshold. Additionally, the instructions are further executable to transmit, via the uplink transmission channel according to the uplink transmit power, an uplink transmission. Additionally, the instructions are further executable to detect a change in the uplink metric in response to transmitting the uplink transmission. Additionally, the instructions are further executable to compare the change in the uplink metric with performance improvement criteria. Additionally, the instructions are further executable to determine, according to the comparing the change in the uplink metric with the performance improvement criteria, whether to adjust the uplink transmit power. Additionally, the instructions are further executable to iterate adjustments to the uplink transmit power in response to determining to adjust the uplink transmit power. Additionally, the instructions are further executable to stop the adjustments to the uplink transmit power in response to determining that the uplink metric meets a performance threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
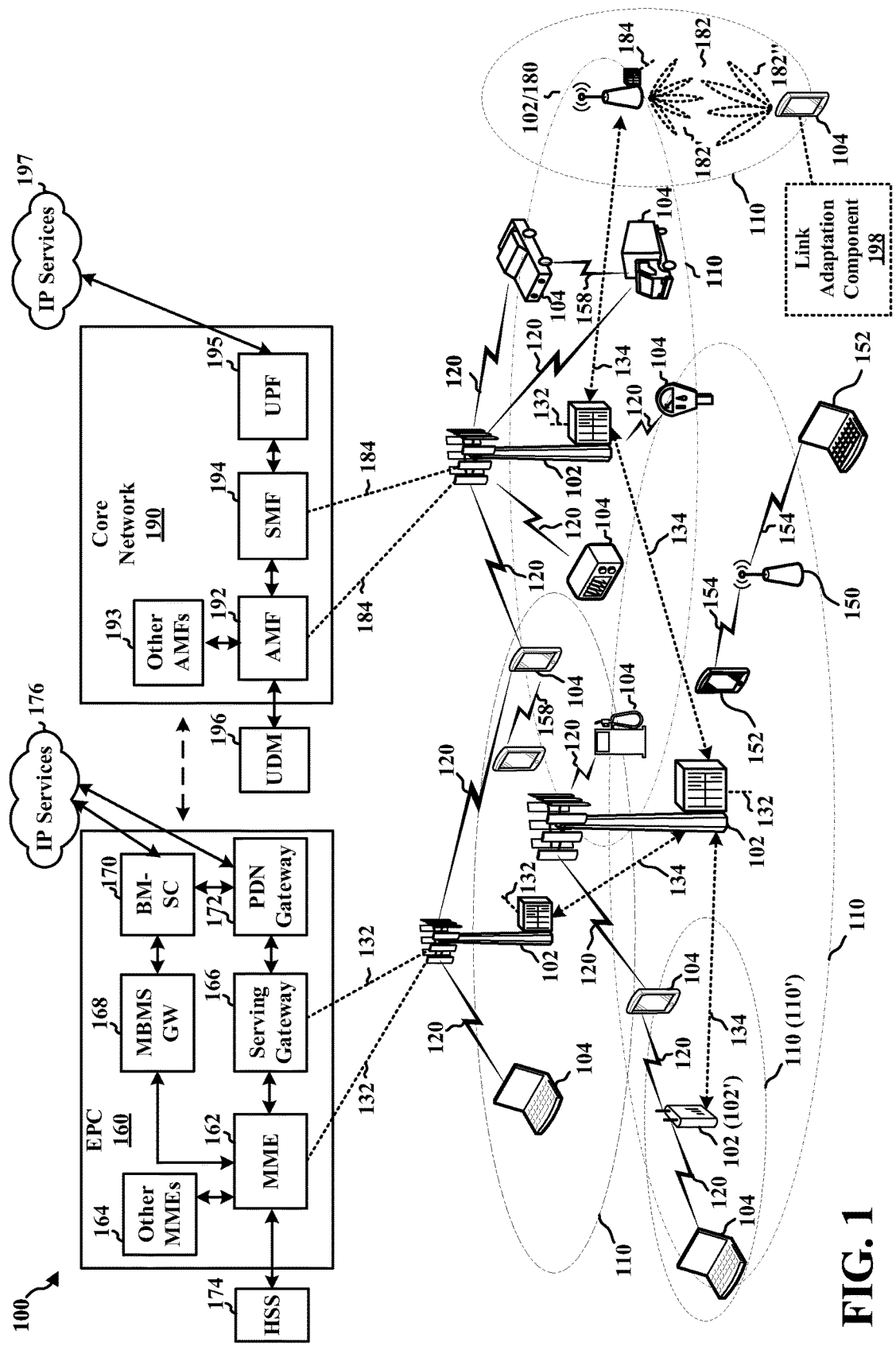
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventional wireless communication systems may perform transmit power control (TPC) to adjust transmit power levels of UEs according to wireless channel conditions. That is, the transmit power levels of the UEs of a conventional wireless communication system may be increased and/or decreased until a desired performance level is achieved (e.g., signal-to-noise ratio, data rate, throughput, block error rate, modulation and coding scheme). Such wireless communication systems may utilize at least one of two power control mechanisms, namely, closed loop power control (CLPC) and open loop power control (OLPC). A network device (e.g., a base station) implementing CPLC may measure power levels of signals received by UEs and may instruct the UEs to increase and/or decrease their corresponding transmit power levels based on the measurements. As such, the network device may adjust the transmit power level of the UEs according to the wireless channel conditions. However, implementation of CLPC by the network device may add complexity and increase the processing load of the network device. For example, the network device may need to measure receive power levels, send power adjustment instructions, and track performance and/or power level metrics for all UEs in a cell managed by the network device.

Alternatively, a network device implementing OLPC may transmit a reference signal at a known transmit level and the UEs may adjust their transmit power levels according to a receive power level of the reference signal. That is, implementation of OLPC by the network device may be less complex and incur less of a processing load on the network device than implementation of CLPC. Thus, some conventional wireless communications systems may implement OLPC only, and not implement CLPC. However, under certain wireless channel conditions, UEs utilizing OLPC to control their transmit power levels may be unable to accurately determine the transmit power levels. For example, a path loss of a receive channel may be different than a path loss of a transmit channel resulting in an over/under estimation of the transmit power level. As a result, performance and efficiency of such a conventional wireless communication system may be negatively impacted.

Aspects presented herein provide for multiple manners for a UE to adjust the transmit power level of the UE according to channel conditions. In some aspects, the UE may iteratively adjust the transmit power level until an uplink metric meets a performance threshold. Further, aspects presented herein may improve uplink performance and increase efficiency of the wireless communication system when compared to a conventional wireless communication system, in particular if or when CLPC is not deployed.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In some aspects, the UE 104 may include a link adaptation component 198. The link adaptation component 198 may be configured to perform UE-based link adaption. For example, the link adaptation component 198 may monitor an uplink metric of an uplink transmission channel, calculate an uplink transmit power based at least on a tolerance threshold, transmit an uplink transmission, detect a change in the uplink metric in response to transmitting the uplink transmission, compare the change in the uplink metric with performance improvement criteria, determine whether to adjust the uplink transmit power, iterate adjustments to the uplink transmit power, and stop the adjustments to the uplink transmit power in response to determining that the uplink metric meets a performance threshold.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 to communicate with another UE 104, such as based on sidelink, V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

Figure 2:
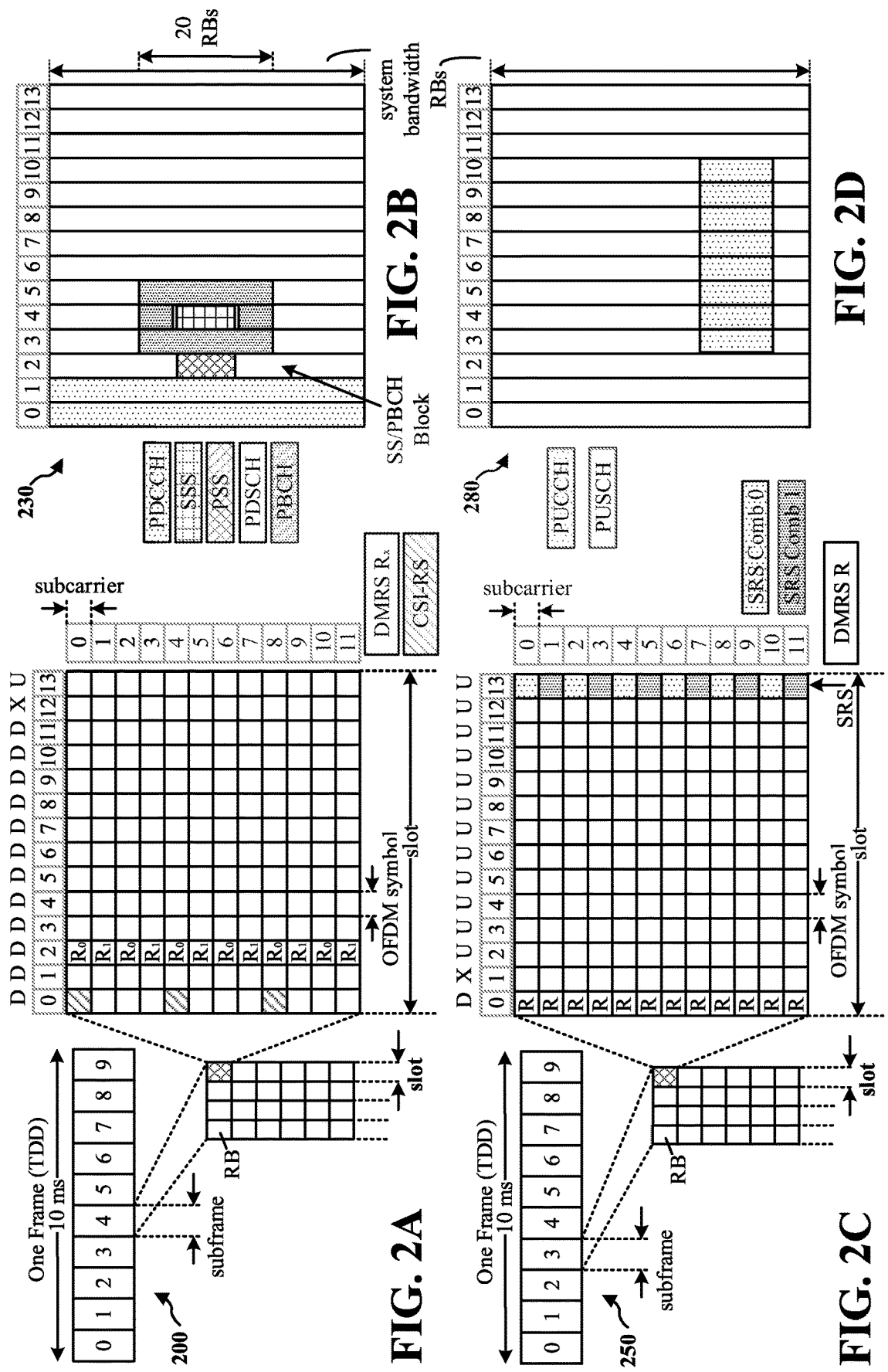
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. In such an example, the slot duration may be 0.25 milliseconds, the subcarrier spacing may be 60 kHz, and the symbol duration may be approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_X$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
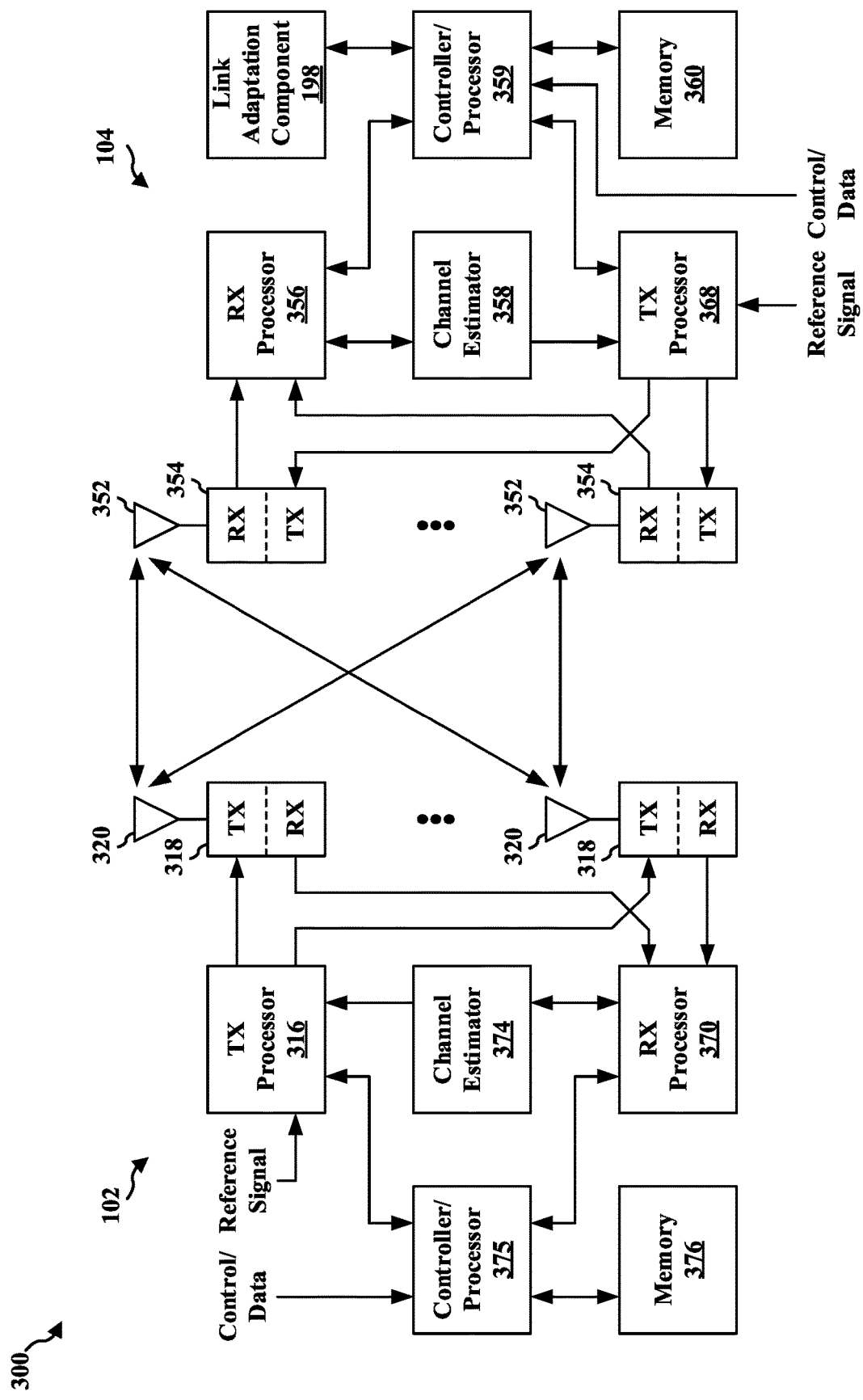
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in an access network. In the downlink, IP packets from the EPC 160 may be provided to a controller/processor 375. The controller/processor 375 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 375 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX may receive a signal through its respective antenna 352. Each receiver 354RX may recover information modulated onto an RF carrier and may provide the information to the receive (RX) processor 356. The TX processor 368 and the RX processor 356 may implement Layer 1 functionality associated with various signal processing functions. The RX processor 356 may perform spatial processing on the information to recover any spatial streams destined for the UE 104. If or when multiple spatial streams are destined for the UE 104, the multiple spatial streams may be combined by the RX processor 356 into a single OFDM symbol stream. The RX processor 356 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 358. The soft decisions may then be decoded and deinterleaved to recover the data and control signals that were originally transmitted by the base station 102 on the physical channel. The data and control signals may then be provided to the controller/processor 359, which may implement Layer 3 and Layer 2 functionality.

The controller/processor 359 can be associated with a memory 360 that stores program codes and data. The memory 360 may be referred to as a non-transitory computer-readable medium. The controller/processor 359 may provide demultiplexing between transport and logical channels, packet reassembly, deciphering, header decompression, and control signal processing to recover IP packets from the EPC 160. The controller/processor 359 is also responsible for error detection using an acknowledge (ACK) and/or negative acknowledge (NACK) protocol to support HARQ operations.

Similar to the functionality described in connection with the transmission by base station 102, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission may be processed at the base station 102 in a manner similar to that described in connection with the receiver function at the UE 104. Each receiver 318RX may receive a signal through its respective antenna 320. Each receiver 318RX may recover information modulated onto an RF carrier and may provide the information to a RX processor 370.

The controller/processor 375 may be associated with, and coupled with, a memory 376 that stores program codes and data. The memory 376 may be referred to as a non-transitory computer-readable medium. The controller/processor 375 may provide demultiplexing between transport and logical channels, packet reassembly, deciphering, header decompression, control signal processing to recover IP packets from the UE 104. IP packets from the controller/processor 375 may be provided to the EPC 160. The controller/processor 375 may also be responsible for error detection using an ACK and/or NACK protocol to support HARQ operations.

In some aspects, the UE 104 may comprise a link adaptation component 198. The link adaptation component 198 may be configured to monitor an uplink metric of an uplink transmission channel. The link adaptation component 198 may be further configured to calculate an uplink transmit power based at least on a tolerance threshold. Alternatively or additionally, the link adaptation component 198 may be configured to transmit, via the uplink transmission channel according to the uplink transmit power, an uplink transmission. Alternatively or additionally, the link adaptation component 198 may be configured to detect a change in the uplink metric in response to transmitting the uplink transmission. Alternatively or additionally, the link adaptation component 198 may be configured to compare the change in the uplink metric with performance improvement criteria. Alternatively or additionally, the link adaptation component 198 may be configured to determine, according to the comparing the change in the uplink metric with the performance improvement criteria, whether to adjust the uplink transmit power. Alternatively or additionally, the link adaptation component 198 may be configured to iterate adjustments to the uplink transmit power. Alternatively or additionally, the link adaptation component 198 may be configured to stop the adjustments to the uplink transmit power in response to determining that the uplink metric meets a performance threshold.

In some aspects, the UE 104 may include a link adaptation component 198. The link adaptation component 198 may be configured to perform UE-based link adaption. For example, the link adaptation component 198 may monitor an uplink metric of an uplink transmission channel, calculate an uplink transmit power based at least on a tolerance threshold, transmit an uplink transmission, detect a change in the uplink metric in response to transmitting the uplink transmission, compare the change in the uplink metric with performance improvement criteria, determine whether to adjust the uplink transmit power, iterate adjustments to the uplink transmit power, and stop the adjustments to the uplink transmit power in response to determining that the uplink metric meets a performance threshold.

In other aspects, at least one of the TX processor 368, the RX processor 356, and the controller/processor 359 may be configured to perform aspects in connection with the link adaptation component 198 of FIG. 1. For example, the memory 360 may store computer-executable instructions defining the link adaptation component 198. In other aspects, the TX processor, the RX processor 356, and/or the controller/processor 359 may be configured to execute the link adaptation component 198.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Wireless communication systems may implement transmit power control (TPC) features for control of UE transmit power levels. The TPC features may provide the wireless communication systems with the ability to adjust UE transmit power levels in order to account for variations in channel conditions. That is, TPC may permit the wireless communication systems to achieve a desired performance level (e.g., signal-to-noise ratio (SNR), data rate, throughput, block error rate (BLER), modulation and coding scheme (MCS)) for wireless channels established with the UEs. Alternatively or additionally, the TPC features may be used to reduce inter-cell and/or intra-cell interference.

The TPC functionality may be achieved using at least one of two power control mechanisms, namely, closed loop power control (CLPC) and open loop power control (OLPC). OLPC may be used to compensate for channel conditions such as path loss and/or shadowing effects (e.g., received power signal fluctuations due to obstructions in the propagation path). Alternatively or additionally, CLPC may be used to compensate for channel conditions such as fast fading (e.g., channel conditions that change rapidly in comparison with a time duration of a symbol).

In some aspects, a wireless communication system may be deployed with only OLPC enabled. That is, CLPC may not be enabled and/or deployed in such a wireless communication system. For example, CLPC may not be deployed due to an added complexity associated with implementation of CLPC. For example, a network device (e.g., base station) deploying CLPC may need to measure receive power levels, send power adjustment instructions, and track performance and/or power level metrics for all (e.g., hundreds) UEs moving into, out of, and within a coverage area managed by the network device.

However, in some aspects, a wireless communication system with only OLPC deployed may be unable to adjust UE transmit power to mitigate degradations due to certain channel conditions, such as inaccuracies in path loss calculations due to under/over estimation of downlink channel conditions, blockages, and/or poor radiated mode performance of the UE antennas.

In other aspects, a wireless communication system may be configured to use TPC as part of link adaptation procedures. That is, a network device performing link adaption may use TPC (i.e., CLPC) to adjust (increase/decrease) a UE transmit power level to determine if or when the UE may sustain, at the adjusted power level, an uplink grant with a higher allocation of resource blocks and/or MCS before reducing the uplink grant to meet a target performance level (e.g., signal-to-noise ratio (SNR), data rate, throughput, block error rate (BLER)). For example, the network device may indicate to the UE to transmit at a higher transmit power level to compensate for channel conditions, rather than reducing the uplink grant. However, OLPC does not provide a functionality for the network device to adjust the UE transmit power level. Thus, a network device of an OLPC-only wireless communication system may not be able to adjust UE transmit power level, as part of link adaptation, and may only reduce the uplink grant to meet the target performance level. As a result, system performance (e.g., throughput) of the OLPC-only wireless communication system may be negatively impacted. That is, a UE of the OLPC-only wireless communication system may perform at a lower throughput due to the lower resource allocation (e.g., uplink grant) when compared to a UE of another wireless communication system in which the network device may adjust the transmit power level of the UE for link adaptation.

Aspects presented herein provide for multiple manners for a UE to adjust the transmit power level of the UE according to channel conditions and/or to compensate for reductions in uplink resource allocations due to link adaptation by a network device. In some aspects, the UE may iteratively adjust the transmit power level until an uplink performance level (e.g., e.g., SNR, data rate, throughput, BLER) meets a performance threshold. Further, aspects presented herein may improve uplink performance and increase efficiency of the wireless communication system when compared to a conventional wireless communication system, in particular if or when CLPC is not deployed.

Figure 4:
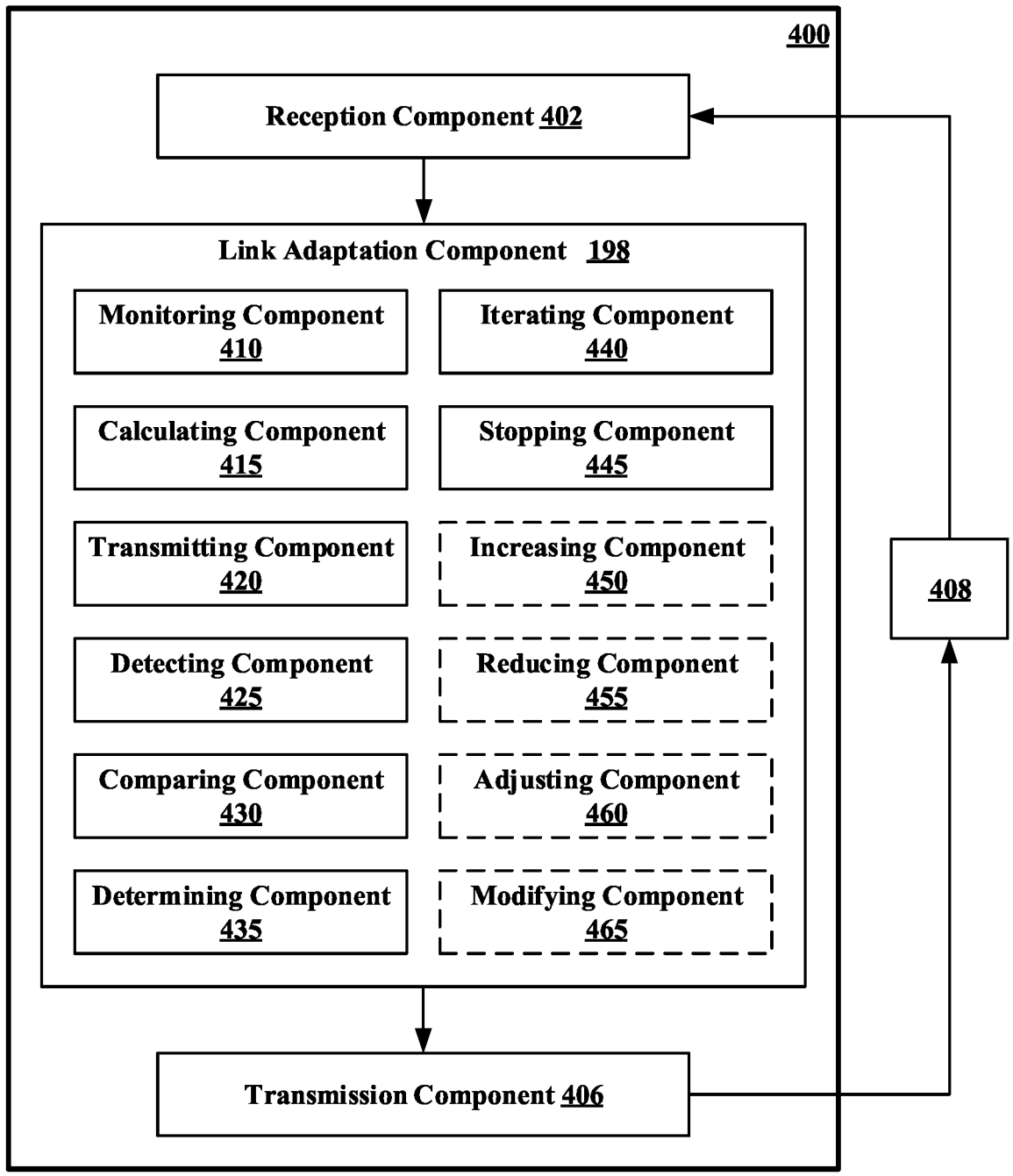
FIG. 4 is a diagram illustrating an example apparatus, such as a user equipment (UE), for wireless communication, in accordance with various aspects of the present disclosure.

FIG. 4 is a block diagram of an example apparatus 400 for wireless communication. The apparatus 400 may be a UE 104 (e.g., UE 104 of FIGS. 1 and 3) or a UE 104 may include the apparatus 400. In some aspects, the apparatus 400 may include a reception component 402 configured to receive wireless communications from another apparatus (e.g., apparatus 408), a link adaptation component 198 configured to perform UE-based link adaption, a transmission component 406 configured to transmit wireless communications to another apparatus (e.g., apparatus 408), and which may be in communication with one another (e.g., via one or more buses or electrical connections). As shown, the apparatus 400 may be in communication with another apparatus 408 (such as a base station 102, or another wireless communication device) using the reception component 402 and the transmission component 406.

In some aspects, the apparatus 400 may be configured to perform one or more operations described herein in connection with FIGS. 1 and 3. Alternatively or additionally, the apparatus 400 may be configured to perform one or more processes described herein, such as method 500 of FIGS. 5-6. In some aspects, the apparatus 400 may include one or more components of the UE 104 described above in connection with FIGS. 1 and 3.

The reception component 402 may receive communications, such as reference signals, control information, data communications, or a combination thereof, from the apparatus 408. The reception component 402 may provide received communications to one or more other components of the apparatus 400, such as the link adaptation component 198. In some aspects, the reception component 402 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 402 may include one or more antennas, a demodulator, a MIMO detector, a receive processor, a controller/processor, a memory, or a combination thereof, of the UE 104 described above in connection with FIGS. 1 and 3.

The transmission component 406 may transmit communications, such as reference signals, control information, data communications, or a combination thereof, to the apparatus 408. In some aspects, the link adaptation component 198 may generate communications and may transmit the generated communications to the transmission component 406 for transmission to the apparatus 408. In some aspects, the transmission component 406 may perform signal processing on the generated communications (such as filtering, amplification, modulation, digital-to-analog conversion, multiplexing, interleaving, mapping, or encoding, among other examples), and may transmit the processed signals to the apparatus 408. In other aspects, the transmission component 406 may include one or more antennas, a modulator, a transmit MIMO processor, a transmit processor, a controller/processor, a memory, or a combination thereof, of the UE 104 described above in connection with FIGS. 1 and 3. In some aspects, the transmission component 406 may be co-located with the reception component 402 in a transceiver or transceiver component.

The link adaptation component 198 may be configured to perform UE-based link adaption. In some aspects, the link adaptation component 198 may include a set of components, such as a monitoring component 410 configured to monitor an uplink metric of an uplink transmission channel, a calculating component 415 configured to calculate an uplink transmit power based at least on a tolerance threshold, a transmitting component 420 configured to transmit an uplink transmission, a detecting component 425 configured to detect a change in the uplink metric in response to transmitting the uplink transmission, a comparing component 430 configured to compare the change in the uplink metric with performance improvement criteria, a determining component 435 configured to determine whether to adjust the uplink transmit power, an iterating component 440 configured to iterate adjustments to the uplink transmit power, and a stopping component 445 configured to stop the adjustments to the uplink transmit power.

In other optional or additional aspects, the link adaptation component 198 may further include an increasing component 450 configured to increase the uplink transmit power by a predetermined amount, a reducing component 455 configured to reduce a second transmit power by a predetermined amount, an adjusting component 460 configured to adjust the new uplink transmit power, a modifying component 465 configured to modify an uplink data split threshold.

Alternatively or additionally, the set of components may be separate and distinct from the link adaptation component 198. In other aspects, one or more components of the set of components may include or may be implemented within a controller/processor (e.g., the TX processor 368, the RX processor 356, the controller/processor 359), a memory (e.g., the memory 360), or a combination thereof, of the UE 104 described in FIGS. 1 and 3. Alternatively or additionally, one or more components of the set of components may be implemented at least in part as software stored in a memory, such as the memory 360. For example, a component (or a portion of a component) may be implemented as computer-executable instructions or code stored in a computer-readable medium (e.g., non-transitory computer readable-medium) and executable by a controller or a processor to perform the functions or operations of the component.

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally or alternatively, a set of (one or more) components shown in FIG. 4 may perform one or more functions described as being performed by another set of components shown in FIGS. 1 and 3.

Figure 5:
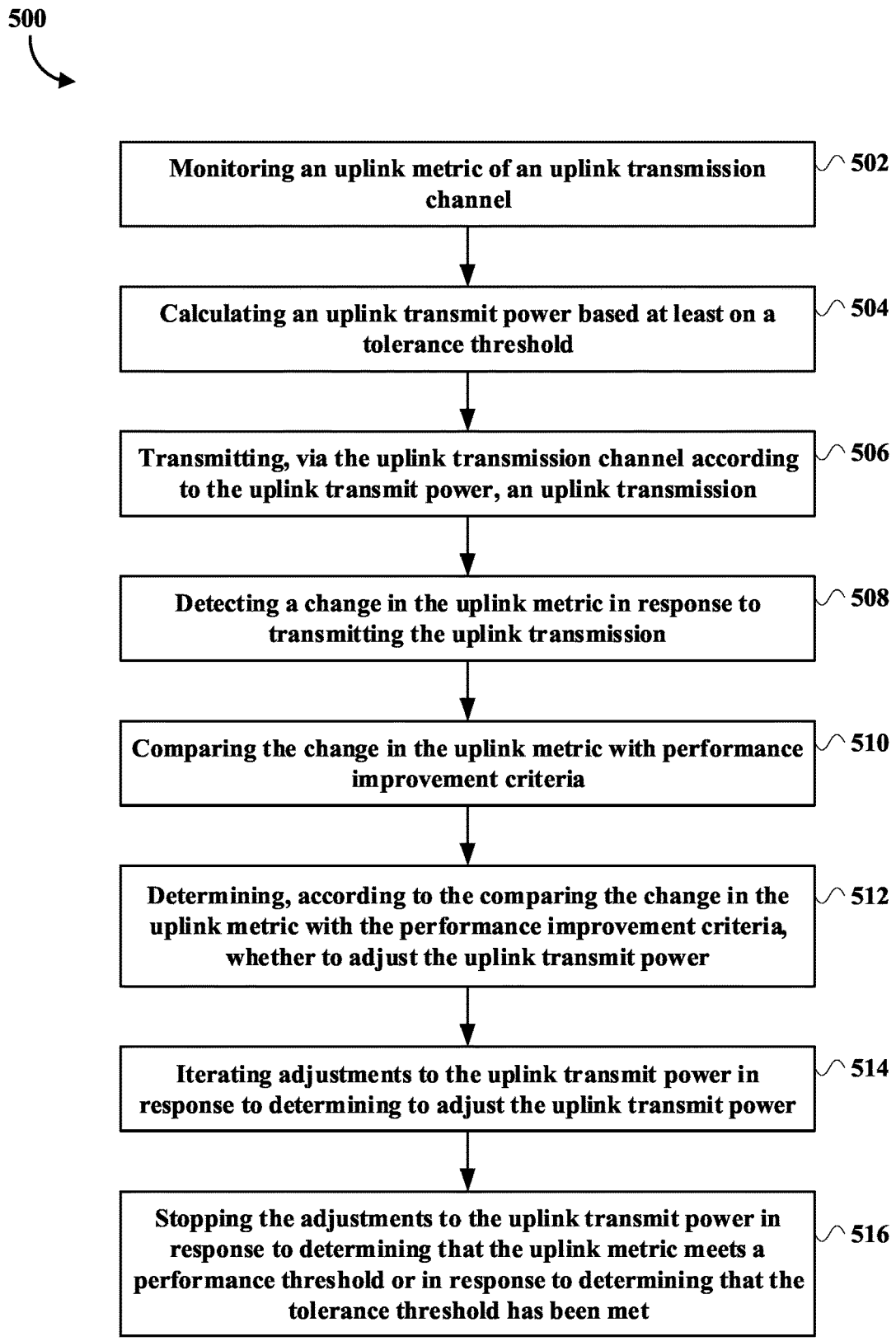
FIG. 5 is a flowchart of a method of wireless communication at a UE, in accordance with various aspects of the present disclosure.
Figure 6:
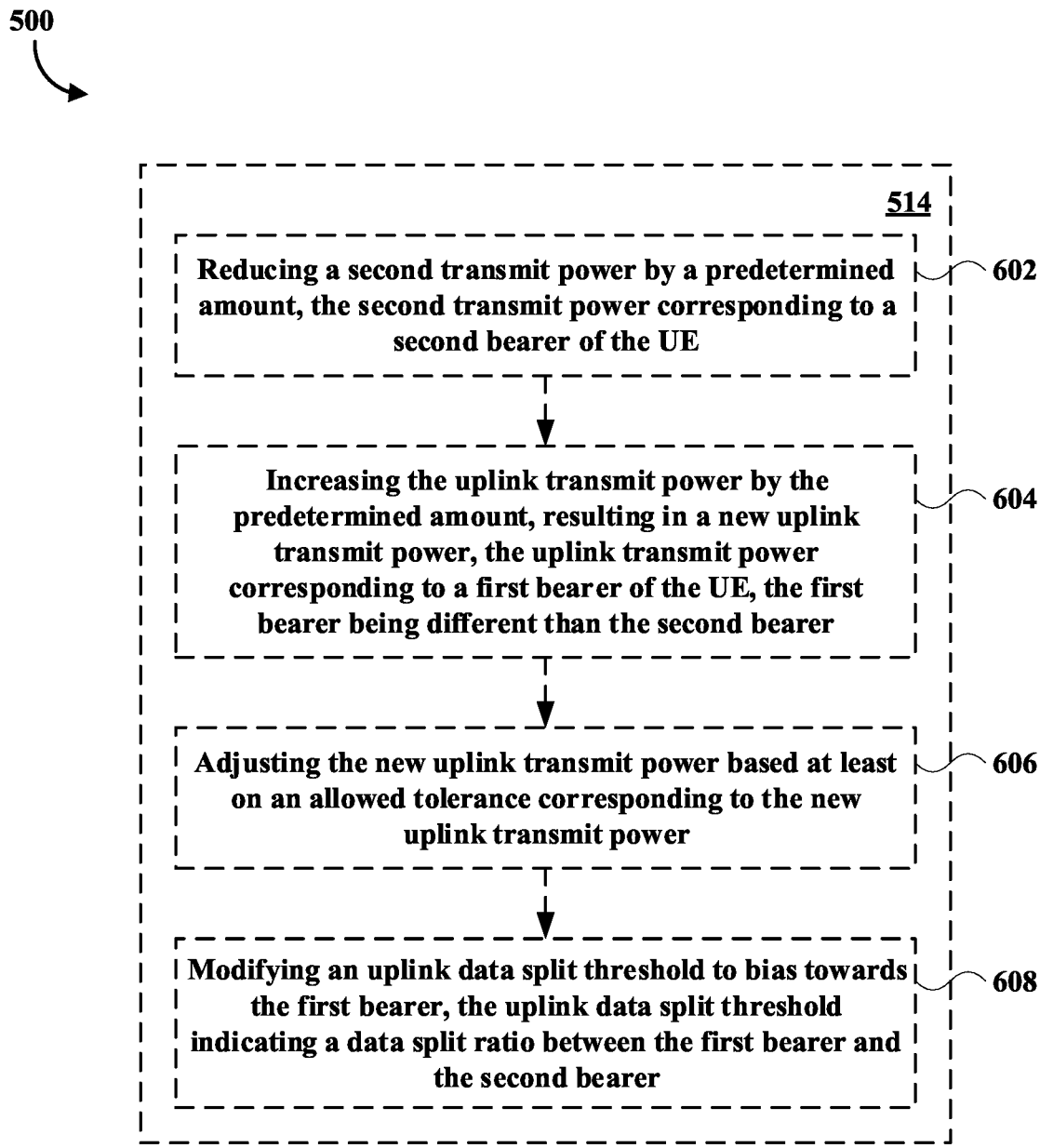
FIG. 6 is a flowchart of additional or optional steps for the method of wireless communication at the UE in accordance with various aspects of the present disclosure.

Referring to FIGS. 5-6, in operation, a UE 104 may perform a method 500 of wireless communication. The method 500 may be performed by the UE 104 (which may include the memory 360 and which may be the entire UE 104 and/or one or more components of the UE 104 such as the link adaptation component 198, the TX processor 368, the RX processor 356, and/or the controller/processor 359). The method 500 may be performed by the link adaptation component 198 in communication with the base station 102.

At block 502 of FIG. 5, the method 500 includes monitoring an uplink metric of an uplink transmission channel. For example, in an aspect, the UE 104, the link adaptation component 198, and/or the monitoring component 410 may be configured to or may comprise means for monitoring the uplink metric of the uplink transmission channel.

For example, the monitoring at block 502 may include monitoring an uplink resource allocation, such as an uplink grant, from the access network 100 (e.g., base station 102). For example, the uplink grant may indicate a number of resource blocks (RBs) and/or a modulation and coding scheme (MCS) to use with uplink transmissions by the UE 104. Alternatively or additionally, the uplink grant may indicate a target performance level (e.g., SNR, data rate, throughput, BLER) for the uplink transmissions.

In some aspects, the monitoring at block 502 may include monitoring the uplink resource allocation against a performance level of the UE 104, such as a percentage of retransmitted uplink packets, an uplink SNR, an uplink data rate, an uplink throughput, and/or an uplink BLER.

In other optional or additional aspects, the monitoring at block 502 may include monitoring a downlink reference signal received power (RSRP) across a plurality of downlink ports of the UE 104. For example, the UE 104 may receive a downlink reference signal (e.g., demodulation reference signal (DMRS) from the base station 102) at each downlink port of the plurality of downlink ports. The UE 104 may measure the downlink RSRP of the downlink reference signal at each downlink port of the plurality of downlink ports. Alternatively or additionally, the UE 104 may measure the downlink RSRP of the downlink reference signal at all downlink ports of the UE 104. That is, the UE 104 may measure the downlink RSRP of all and/or a portion of the downlink ports of the UE 104.

Further, for example, the monitoring at block 502 may be performed to obtain the uplink grant which the UE 104 may configure uplink transmissions. In addition, the monitoring at block 502 may allow the UE 104 to determine whether the base station 102 has changed the uplink resource allocation of the UE 104. Thus, aspects presented herein may allow the UE 104 to determine whether to adjust the uplink transmit power until the uplink metric meets a performance threshold. Further, aspects presented herein may improve uplink performance and increase efficiency of the wireless communication system when compared to a conventional wireless communication system, in particular if or when CLPC is not deployed.

At block 504 of FIG. 5, the method 500 includes calculating an uplink transmit power based at least on a tolerance threshold. For example, in an aspect, the UE 104, the link adaptation component 198, and/or the calculating component 415 may be configured to or may comprise means for calculating the uplink transmit power based at least on the tolerance threshold.

For example, the calculating at block 504 may include obtaining a configured maximum transmit (e.g., output) power level $P_{CMAX}$. The configured maximum transmit power level $P_{CMAX}$ may indicate a maximum power level at which the UE 104 is allowed to transmit. In some aspects, the configured maximum transmit power level may vary according to a carrier frequency f and/or a serving cell c of the access network 100 (e.g., $P_{CMAX,f,c}$).

In other optional or additional aspects, the UE 104 may receive the value of $P_{CMAX,f,c}$ from the base station 102. For example, the value of $P_{CMAX,f,c}$ may be indicated in the uplink grant. Alternatively or additionally, the UE 104 may compute the value of $P_{CMAX,f,c}$ according to one or more configuration parameters.

In other optional or additional aspects, the calculating at block 504 may include determining an allowed tolerance T based on the configured maximum transmit power level $P_{CMAX,f,c}$, as shown in Table 1.

TABLE 1

$P_{CMAX,f,c}$ Tolerances.

| $P_{CMAX,f,c}$ (dBm) | Tolerance $T(P_{CMAX,f,c})$ (dB) |
|---|---|
| $23 < P_{CMAX,c} \leq 33$ | 2.0 |
| $21 \leq P_{CMAX,c} \leq 23$ | 2.0 |
| $20 \leq P_{CMAX,c} < 21$ | 2.5 |
| $19 \leq P_{CMAX,c} < 20$ | 3.5 |
| $18 \leq P_{CMAX,c} < 19$ | 4.0 |
| $13 \leq P_{CMAX,c} < 18$ | 5.0 |
| $8 \leq P_{CMAX,c} < 13$ | 6.0 |
| $-40 \leq P_{CMAX,c} < 8$ | 7.0 |

For example, referring to Table 1, if or when the value of the configured maximum transmit power level $P_{CMAX,f,c}$ is 19.5, the UE 104 may determine that the allowed tolerance T is 3.5 dB. That is, in such an example, the UE 104 may be allowed to transmit a signal having a power level of up to 23 dBm (e.g., 19.5 dBm+3.5 dB). In some aspects, the allowed tolerance may account for variations in accuracy of the transmit power level across temperature and/or across frequency.

In other optional or additional aspects, the calculating at block 504 may include calculating the uplink transmit power level P at the UE 104 (in dBm) using the following equation:

$$P[\text{dBm}] = \min\left\{ \begin{array}{c} P_{max}, \\ P_0 + 10\log_{10}(M) + \alpha PL + \Delta_{mcs} + f(\Delta_i) \end{array} \right\} \quad \text{(Eq. 1)}$$

Referring to Eq. 1, term $P_{max}$ represents a maximum transmit power level of the UE 104. That is, the term $P_{max}$ represents a maximum power level that the UE 104 may be capable to transmit. Term Po represents a target receive power per resource block (RB). Term M represents a number of RBs currently assigned to the UE 104. For example, the value of M may have been indicated in the uplink grant from the base station 102. Term α represents a fractional path-loss compensation factor. Term PL represents a downlink path-loss estimate. The downlink path-loss estimate may be calculated by the UE 104 based on a power level of a received reference signal (e.g., DMRS from the base station 102). Term $\Delta_{mcs}$ represents a MCS-based power offset. The value of $\Delta_{mcs}$ may have been indicated in the uplink grant from the base station 102. The term $f(\Delta_i)$ may represent a closed-loop correction factor. In some aspects, the transmit power level calculation shown in Eq. 1 may be predefined by one or more regulations and/or standards (e.g., 3GPP standards).

The terms $\Delta_{mcs}$ and $f(\Delta_i)$ in Eq. 1 may not be related to open loop power control (OLPC), and, as such, Eq. 1 may be simplified for an OLPC-only wireless communication system to the following equation:

$$P[\text{dBm}] = \min\left\{ \begin{array}{c} P_{max}, \\ P_0 + 10\log_{10}(M) + \alpha PL \end{array} \right\} \quad \text{(Eq. 2)}$$

Alternatively or additionally, the calculation for uplink transmit power level P shown in Eq. 2 may be further modified as shown in the following equation:

$$P[\text{dBm}] = \min\left\{ \begin{array}{c} P_{max}, \\ P_0 + 10\log_{10}(M) + \alpha PL + g(T(P_{cmax,f,c})) \end{array} \right\} \quad \text{(Eq. 3)}$$

Referring to Eq. 3, term $g(T(P_{CMAX,f,c}))$ represents a function whose value may depend on the allowed tolerance at the configured maximum transmit power level for the carrier frequency f of the serving cell c (e.g., $T(P_{CMAX,f,c})$). For example, the value of function g( ) may be capped (e.g., upper limited) as shown in the following equation:

$$g(T(P_{cmax,f,c})) \leq T(P_{cmax,f,c}) - T_{error} \quad \text{(Eq. 4)}$$

Referring to Eq. 4, term $T_{error}$ represents a transmit power inaccuracy of the UE 104. That is, the allowed tolerance for the maximum transmit power level may be reduced to account for other transmit power inaccuracies of the UE 104. For example, $T_{error}$ may account for transmit power inaccuracies that do not depend on temperature and/or frequency variations. As such, the UE 104 may not transmit at a power level that exceeds and/or violates the configured maximum transmit power $P_{CMAX,f,c}$. In some aspects, the value of $T_{error}$ may be predefined and accessed by the UE 104. For example, the value of $T_{error}$ may be determined at a time of manufacture of the UE 104 and stored in the UE 104. Alternatively or additionally, the value of $T_{error}$ may be determined according to design characteristics of the UE 104.

In other optional or additional aspects, the uplink transmit power level P may limited such that a resulting measured configured maximum output power $P_{UMAX,f,c}$ may be bound within the following limits:

$$P_{CMAX\_L,f,c} - \max\{T_{L,c}, T(P_{CMAX\_L,f,c})\} \leq P_{UMAX,f,c} \leq P_{CMAX\_H,f,c} + T(P_{CMAX\_H,f,c}) \quad \text{(Eq. 5)}$$

Referring to Eq. 5, terms $P_{CMAX\_L,f,c}$ and $P_{CMAX\_H,f,c}$ represent lower and upper bounds of the configured maximum transmit power for the carrier frequency f of the serving cell c (e.g., $P_{CMAX,f,c}$). Term $T_{L,c}$ represents an absolute value of the lower tolerance for the applicable operating band. The tolerances $T(P_{CMAX,c})$ for the applicable values of $P_{CMAX,c}$ may be specified by Table 1.

That is, in such optional or additional aspects, the uplink transmit power level P may be restricted from resulting in a measured configured maximum output power $P_{UMAX,f,c}$ that exceeds the limits set by Eq. 5.

Further, for example, the calculating at block 504 may be performed to calculate a transmit power level for uplink transmissions of the UE 104 that do not exceed the allowed tolerance for the configured maximum transmit power level for the carrier frequency and/or the serving cell of the base station 102.

At block 506 of FIG. 5, the method 500 includes transmitting, via the uplink transmission channel according to the uplink transmit power, an uplink transmission. For example, in an aspect, the UE 104, the link adaptation component 198, and/or the transmitting component 420 may be configured to or may comprise means for transmitting, via the uplink transmission channel according to the uplink transmit power, the uplink transmission.

For example, the transmitting at block 506 may include transmitting the uplink transmission at the uplink transmit power level calculated at block 504.

In some aspects, the uplink transmit power level of the uplink transmission may exceed the configured maximum transmit power level but may be within the allowed tolerance for the configured maximum transmit power level. Such an uplink transmit power level may be in conformance with one or more regulations and/or standards (e.g., 3GPP standards). For example, a conventional communication system may boost (e.g., increase) a maximum transmit power level (MTPL) beyond a value specified in one or more standards (e.g., 23/26 dBm) to improve cell coverage in far cell conditions.

In other optional or additional aspects, the transmitting at block 506 of the uplink transmission may cause the base station 102, as part of a link adaptation procedure, to perform one or more measurements on the received signal comprising the uplink transmission. Additionally or alternatively, the base station 102 may determine, according to the one or more measurements, whether to adjust the uplink resource allocation for the UE 104. For example, if or when the one or more measurements indicate that a target performance level (e.g., SNR, data rate, throughput, BLER) is not met, the base station 102 may determine to reduce the uplink resource allocation (e.g., reduce the number of RBs allocated to the UE 104 and/or change the MCS assigned to the UE 104.) Alternatively or additionally, if or when the one or more measurements indicate that the target performance level is met, the base station 102 may determine to either refrain from adjusting uplink resource allocation or to increase the uplink resource allocation (e.g., increase the number of RBs allocated to the UE 104 and/or change the MCS assigned to the UE 104).

Further, for example, the transmitting at block 506 may be performed to transmit the uplink transmission at a transmit power level that does not exceed the allowed tolerance for the configured maximum transmit power level for the carrier frequency and/or the serving cell of the base station 102. Further, the transmit power level may conform with one or more regulations and/or standards (e.g., 3GPP standards).

At block 508 of FIG. 5, the method 500 includes detecting a change in the uplink metric in response to transmitting the uplink transmission. For example, in an aspect, the UE 104, the link adaptation component 198, and/or the detecting component 425 may be configured to or may comprise means for detecting the change in the uplink metric in response to transmitting the uplink transmission.

For example, the detecting at block 508 may include receiving an uplink grant subsequent to, and in response to, the uplink transmission performed at block 506. In some aspects, the detecting at block 508 may include detecting that the received uplink grant indicates a different uplink resource allocation than the uplink grant monitored at block 502. For example, the received uplink grant may indicate a different number of RBs and/or a different MCS for use with subsequent uplink transmissions by the UE 104.

In other optional or additional aspects, the detecting at block 508 may include waiting for a particular waiting period prior to detecting whether the uplink resource allocation has changed in response to transmitting the uplink transmission. For example, the UE 104 may wait for the particular waiting period to allow the base station 102 to receive the uplink transmission performed at block 506, to determine whether to adjust the uplink resource allocation, and to transmit the received uplink grant comprising the adjusted uplink resource allocation. In some aspects, the particular waiting period may be predetermined by the UE 104. In other optional or additional aspects, the particular waiting period may be indicated as a number of seconds and/or as a number of slots.

Further, for example, the detecting at block 508 may be performed to determine whether the base station 102 has changed the uplink resource allocation of the UE 104. Thus, aspects presented herein may allow the UE 104 to determine whether to adjust the uplink transmit power until the uplink metric meets a performance threshold. Further, aspects presented herein may improve uplink performance and increase efficiency of the wireless communication system when compared to a conventional wireless communication system, in particular if or when CLPC is not deployed.

At block 510 of FIG. 5, the method 500 includes comparing the change in the uplink metric with performance improvement criteria. For example, in an aspect, the UE 104, the link adaptation component 198, and/or the comparing component 430 may be configured to or may comprise means for comparing the change in the uplink metric with performance improvement criteria.

For example, the comparing at block 510 may include determining whether the uplink resource allocation has been adjusted to reach desired performance improvement criteria. That is, the comparing at block 510 may include determining whether the uplink resource allocation has been adjusted by the base station 102 as part of a link adaptation procedure, as described in further detail above in reference to block 506.

In some aspects, the comparing at block 510 may include determining a magnitude of the change in the uplink metric. That is, the magnitude may correspond to a difference in RBs allocated to the UE 104, to a change in the MCS allocated to the UE 104, and/or to a combination thereof. In other optional or additional aspects, the comparing at block 510 may include determining whether the magnitude of the change in the uplink metric meets the performance improvement criteria. For example, if or when the magnitude of the change in the uplink metric meets or exceeds the performance improvement criteria, the UE 104 may determine to adjust the uplink transmit power. Alternatively or additionally, if or when the magnitude of the change in the uplink metric does not meet the performance improvement criteria, the UE 104 may determine not to adjust the uplink transmit power.

Further, for example, the comparing at block 510 may be performed to allow the UE 104 to determine whether to adjust the uplink transmit power of the UE 104. For example, the UE 104 may adjust the uplink transmit power to compensate for a reduction in the uplink resource allocation cause by a link adaptation procedure of the base station 102. Thus, aspects presented herein may allow the UE 104 to determine whether to adjust the uplink transmit power until the uplink metric meets a performance threshold. Further, aspects presented herein may improve uplink performance and increase efficiency of the wireless communication system when compared to a conventional wireless communication system, in particular if or when CLPC is not deployed.

At block 512 of FIG. 5, the method 500 includes determining, according to the comparing the change in the uplink metric with the performance improvement criteria, whether to adjust the uplink transmit power. For example, in an aspect, the UE 104, the link adaptation component 198, and/or the determining component 435 may be configured to or may comprise means for determining, according to the comparing the change in the uplink metric with the performance improvement criteria, whether to adjust the uplink transmit power.

For example, the determining at block 512 may include determining whether or not to adjust the uplink transmit power of the UE 104 according to the comparing the change in the uplink resource allocation with a target performance level (e.g., SNR, data rate, throughput, BLER), as described above in reference to block 510.

In some aspects, the determining at block 512 may include determining whether CLPC is deployed and/or enabled on the access network 100. For example, if or when CLPC is deployed and/or enabled on the access network 100, the UE 104 may determine not to adjust the uplink transmit power. In such aspects, the access network 100 (e.g., base station 102) may adjust the uplink transmit power of the UE 104 using the CLPC functionality. Alternatively or additionally, if or when CLPC is not deployed and/or disabled on the access network 100, the UE 104 may determine to adjust the uplink transmit power.

Further, for example, the determining at block 512 may be performed to determine whether the UE 104 needs to adjust the uplink transmit power level to compensate for a reduction in the uplink resource allocation caused by a link adaptation procedure of the base station 102. Thus, aspects presented herein may allow the UE 104 to determine whether to adjust the uplink transmit power until the uplink metric meets a performance threshold. Further, aspects presented herein may improve uplink performance and increase efficiency of the wireless communication system when compared to a conventional wireless communication system, in particular if or when CLPC is not deployed.

At block 514 of FIG. 5, the method 500 includes iterating adjustments to the uplink transmit power in response to determining to adjust the uplink transmit power. For example, in an aspect, the UE 104, the link adaptation component 198, and/or the iterating component 440 may be configured to or may comprise means for iterating adjustments to the uplink transmit power in response to determining to adjust the uplink transmit power.

For example, the iterating at block 514 may include calculating an adjusted uplink transmit power level. That is, the iterating at block 514 may include calculating the adjusted uplink transmit power level in response to a determination to adjust the uplink transmit power, as described above in reference to block 512. Referring to Eq. 3, the adjusted uplink transmit power may be calculated by adjusting (e.g., increasing, decreasing) the value of the g( ) function.

In some aspects, the iterating at block 514 may include iteratively varying the value of the go function within the allowed tolerance $T(P_{CMAX,f,c})$ to determine a minimum positive value that may improve the uplink performance level (e.g., uplink SNR, uplink data rate, uplink throughput, uplink BLER) and/or may improve the uplink resource allocation.

In other optional or additional aspects, the iterating at block 514 may include adjusting the uplink transmit power level by a step amount (e.g., a predetermined amount). That is, the value of the go function may be adjusted by the step amount. For example, the iterating at block 514 may include increasing the uplink transmit power by the step amount. Alternatively or additionally, the uplink transmit power may be decreased by the step amount. In other optional or additional aspects, the step amount may be predetermined by the UE 104. Alternatively or additionally, the step amount may be determined by the base station 102 and indicated to the UE 104.

In other optional or additional aspects, the iterating at block 514 may include calculating the new uplink transmit power based at least on an allowed tolerance corresponding to a current uplink transmit power. That is, the value of function g( ), which is used to calculate the new uplink transmit power, may be capped (e.g., upper limited) as shown in Eq. 4, and described above in further detail in reference to block 504.

In other optional or additional aspects, the iterating at block 514 may include performing one or more operations described herein in connection with blocks 504-512. That is, the iterating at block 514 may include calculating a new uplink transmit power (described in further detail above in reference to block 504 and further described in reference to block 514). In such optional or additional aspects, the iterating at block 514 may include transmitting another uplink transmission using the new uplink transmit power (described in further detail above in reference to block 506). In such optional or additional aspects, the iterating at block 514 may include detecting a change in the uplink metric (described in further detail above in reference to block 508). In such optional or additional aspects, the iterating at block 514 may include comparing the change in the uplink metric with the performance improvement criteria (described in further detail above in reference to block 510). In such optional or additional aspects, the iterating at block 514 may include determining whether to adjust the uplink transmit power (described in further detail above in reference to block 512).

In other optional or additional aspects, the iterating at block 514 may include calculating the new uplink transmit power based at least on a downlink RSRP imbalance across the plurality of downlink ports of the UE 104. For example, the UE 104 may calculate the downlink RSRP imbalance across a plurality of receive (Rx) chains of the UE 104 using the primary receive (PRx) chain as a reference. That is, the downlink RSRSP imbalance of each Rx chain (other than the PRx chain) may correspond to a difference in the downlink RSRP between the PRx chain and the particular Rx chain. Alternatively or additionally, the iterating at block 514 may include mapping the calculated downlink RSRP imbalance to an adjustment (e.g., correction) to be applied to the uplink transmit power of the UE 104. For example, the UE 104 may determine, according to the mapping, to increase or decrease the uplink transmit power level to attempt to correct the downlink RSRP imbalance.

In such optional or additional aspects, the iterating at block 514 may include monitoring an uplink performance level (e.g., uplink SNR, uplink data rate, uplink throughput, uplink BLER) to determine whether additional adjustments to the uplink transmit power may be needed. For example, the UE 104 may wait for a particular waiting period prior to determining whether additional adjustments to the uplink transmit power may be needed, as described above in further detail in reference to block 508.

Further, for example, the iterating at block 514 may be performed to determine an uplink transmit power level that may improve the uplink performance level (e.g., uplink SNR, uplink data rate, uplink throughput, uplink BLER) and/or may improve the uplink resource allocation. Further, aspects presented herein may improve uplink performance and increase efficiency of the wireless communication system when compared to a conventional wireless communication system, in particular if or when CLPC is not deployed.

At block 516 of FIG. 5, the method 500 includes stopping the adjustments to the uplink transmit power in response to determining that the uplink metric meets a performance threshold or in response to determining that the tolerance threshold has been met. For example, in an aspect, the UE 104, the link adaptation component 198, and/or the stopping component 445 may be configured to or may comprise means for stopping the adjustments to the uplink transmit power in response to determining that the uplink metric meets the performance threshold or in response to determining that the tolerance threshold has been met.

For example, the stopping at block 516 may include stopping the iterating of the uplink transmit power at block 514 in response to determining that the uplink resource allocation meets a performance threshold. For example, the UE 104 may determine to stop iterating the uplink transmit power if or when a number of RBs allocated to the UE 104 meets the performance threshold. In some aspects, the performance threshold may be predetermined by the UE 104. Alternatively or additionally, the base station 102 may determine the performance threshold and may indicate the performance threshold to the UE 104.

In other optional or additional aspects, the stopping at block 516 may include stopping the iterating of the uplink transmit power in response to determining that the uplink transmit power level may not be further increased. For example, the UE 104 may determine that the value of function g( ) has reached an upper limit, as described in reference to Eq. 4. Alternatively or additionally, the UE 104 may determine that the value of function g( ) may exceed the upper limit if or when the uplink transmit power level is increased further.

In other optional or additional aspects, the stopping at block 516 may include determining that the change in the uplink resource allocation is less than a performance improvement threshold. For example, the stopping at block 516 may include determining a magnitude of the change in the uplink metric. That is, the magnitude may correspond to a difference in RBs allocated to the UE 104, to a change in the MCS allocated to the UE 104, and/or to a combination thereof. In other optional or additional aspects, the stopping at block 516 may include determining whether the magnitude of the change in the uplink metric meets the performance improvement threshold. For example, if or when the magnitude of the change in the uplink metric meets or exceeds the performance improvement threshold, the UE 104 may determine to adjust the uplink transmit power. Alternatively or additionally, if or when the magnitude of the change in the uplink metric does not meet the performance improvement threshold, the UE 104 may determine not to adjust the uplink transmit power.

In such optional or additional aspects, the performance improvement threshold may be predetermined by the UE 104. Alternatively or additionally, the base station 102 may determine the performance improvement threshold and may indicate the performance improvement threshold to the UE 104.

Further, for example, the stopping at block 516 may be performed to stop adjustments to the uplink transmit power if or when an uplink transmit power level that may improve the uplink performance level (e.g., uplink SNR, uplink data rate, uplink throughput, uplink BLER) and/or may improve the uplink resource allocation may have been determined. Further, aspects presented herein may improve uplink performance and increase efficiency of the wireless communication system when compared to a conventional wireless communication system, in particular if or when CLPC is not deployed.

Referring to FIG. 6, in an optional or additional aspect that may be combined with any other aspect, at block 602, the iterating at block 514 of iterating the adjustments to the uplink transmit power may include reducing a second transmit power by a predetermined amount, the second transmit power corresponding to a second bearer of the UE. For example, in an aspect, the UE 104, the link adaptation component 198, and/or the reducing component 455 may be configured to or may comprise means for reducing the second transmit power by the predetermined amount, the second transmit power corresponding to the second bearer of the UE 104.

For example, the reducing at block 602 may include reducing the second transmit power corresponding to the second bearer (e.g., LTE) of the UE 104 such that the uplink transmit power corresponding to the first bearer (e.g., NR) may be increased without affecting a total transmitted power of the UE 104. In some aspects, the UE 104 may be configured to operate in a non-standalone (NSA) mode operating on the first carrier (e.g., NR) and the second carrier (e.g., LTE). That is, the UE 104 may transmit a portion of uplink data over the first carrier and a remaining portion of the uplink data over the second carrier, according to an uplink data split threshold. The uplink data split threshold may be determined by the UE 104.

In this optional or additional aspect, at block 604, the iterating at block 514 of iterating the adjustments to the uplink transmit power may include increasing the uplink transmit power by the predetermined amount, resulting in a new uplink transmit power, the uplink transmit power corresponding to a first bearer of the UE, the first bearer being different than the second bearer. For example, in an aspect, the UE 104, the link adaptation component 198, and/or the increasing component 450 may be configured to or may comprise means for increasing the uplink transmit power by the predetermined amount, resulting in the new uplink transmit power, the uplink transmit power corresponding to the first bearer of the UE 104, the first bearer being different than the second bearer.

For example, the increasing at block 604 may include determining to increase the uplink transmit power by the predetermined amount as described above in reference to block 514 of FIG. 5. The uplink transmit power may be increased by a same amount as the second transmit power was reduced at block 602, as to avoid increasing a total transmitted power of the UE 104.

In this optional or additional aspect, at block 606, the iterating at block 514 of iterating the adjustments to the uplink transmit power may include adjusting the new uplink transmit power based at least on an allowed tolerance corresponding to the new uplink transmit power. For example, in an aspect, the UE 104, the link adaptation component 198, and/or the adjusting component 460 may be configured to or may comprise means for adjusting the new uplink transmit power based at least on the allowed tolerance corresponding to the new uplink transmit power.

For example, the adjusting at block 606 may include iterating adjustments to the uplink transmit power as described above in reference to block 514. Alternatively or additionally, the adjusting at block 606 may include iterating corresponding adjustments to the second transmit power, as to avoid increasing a total transmitted power of the UE 104.

In this optional or additional aspect, at block 608, the iterating at block 514 of iterating the adjustments to the uplink transmit power may include modifying an uplink data split threshold to bias towards the first bearer, the uplink data split threshold indicating a data split ratio between the first bearer and the second bearer. For example, in an aspect, the UE 104, the link adaptation component 198, and/or the modifying component 465 may be configured to or may comprise means for modifying the uplink data split threshold to bias towards the first bearer, the uplink data split threshold indicating the data split ratio between the first bearer and the second bearer.

For example, the modifying at block 608 may include modifying the uplink data split threshold to bias towards the first bearer in response to determining that the adjusted uplink transmit power increased the uplink resource allocation and/or improved one or more uplink performance levels. Alternatively or additionally, the UE 104 may report the modified uplink data split threshold to the base station 102 with an updated buffer status report (BSR). The modifying at block 608 may be performed to increase the uplink transmit power of the first bearer (and/or decrease the second transmit power of the second bearer) without increasing the total transmit power of the UE.

Implementation examples are described in the following numbered clauses

1. A method of wireless communication at a UE of a mobile network, comprising:

monitoring an uplink metric of an uplink transmission channel;

calculating an uplink transmit power based at least on a tolerance threshold;

transmitting, via the uplink transmission channel according to the uplink transmit power, an uplink transmission;

detecting a change in the uplink metric in response to transmitting the uplink transmission;

comparing the change in the uplink metric with performance improvement criteria;

determining, according to the comparing the change in the uplink metric with the performance improvement criteria, whether to adjust the uplink transmit power;

iterating adjustments to the uplink transmit power in response to determining to adjust the uplink transmit power; and stopping the adjustments to the uplink transmit power in response to determining that the uplink metric meets a performance threshold or in response to determining that the tolerance threshold has been met.

2. The method of clause 1, wherein the uplink metric comprises at least one of an uplink resource allocation and a block error rate.

3. The method of any previous clause, wherein iterating the adjustments to the uplink transmit power comprises:

increasing the uplink transmit power by a predetermined amount.

4. The method of any previous clause, wherein determining that the uplink metric meets the performance threshold comprises:

determining that the change in the uplink metric is less than a performance improvement threshold.

5. The method of any previous clause, wherein iterating the adjustments to the uplink transmit power comprises:

calculating a new uplink transmit power based at least on a downlink RSRP imbalance across a plurality of downlink ports of the UE.

6. The method of any previous clause, wherein iterating the adjustments to the uplink transmit power comprises:

calculating a new uplink transmit power based at least on an allowed tolerance corresponding to a current uplink transmit power.

7. The method of any previous clause, wherein iterating the adjustments to the uplink transmit power comprises:

reducing a second transmit power by a predetermined amount, the second transmit power corresponding to a second bearer of the UE;

increasing the uplink transmit power by the predetermined amount, resulting in a new uplink transmit power, the uplink transmit power corresponding to a first bearer of the UE, the first bearer being different than the second bearer; and adjusting the new uplink transmit power based at least on an allowed tolerance corresponding to the new uplink transmit power.

8. The method of any previous clause, wherein iterating the adjustments to the uplink transmit power further comprises:

modifying an uplink data split threshold to bias towards the first bearer, the uplink data split threshold indicating a data split ratio between the first bearer and the second bearer.

9. An apparatus of wireless communication at a UE of a mobile network, comprising:

a memory comprising instructions; and a processor communicatively coupled with the memory and configured to execute the instructions to:

monitor an uplink metric of an uplink transmission channel;

calculate an uplink transmit power based at least on a tolerance threshold;

transmit, via the uplink transmission channel according to the uplink transmit power, an uplink transmission;

detect a change in the uplink metric in response to transmitting the uplink transmission;

compare the change in the uplink metric with performance improvement criteria;

determine, according to the comparing the change in the uplink metric with the performance improvement criteria, whether to adjust the uplink transmit power;

iterate adjustments to the uplink transmit power in response to determining to adjust the uplink transmit power; and stop the adjustments to the uplink transmit power in response to a determination that the uplink metric meets a performance threshold.

10. The apparatus of clause 9, wherein the uplink metric comprises at least one of an uplink resource allocation and a block error rate.

11. The apparatus of any previous clause, wherein to iterate the adjustments to the uplink transmit power comprises:

increasing the uplink transmit power by a predetermined amount.

12. The apparatus of any previous clause, wherein the determination that the uplink metric meets the performance threshold comprises:

determining that the change in the uplink metric is less than a performance improvement threshold.

13. The apparatus of any previous clause, wherein to iterate the adjustments to the uplink transmit power comprises:

calculating a new uplink transmit power based at least on a downlink RSRP imbalance across a plurality of downlink ports of the UE.

14. The apparatus of any previous clause, wherein to iterate the adjustments to the uplink transmit power comprises:

calculating a new uplink transmit power based at least on an allowed tolerance corresponding to a current uplink transmit power.

15. The apparatus of any previous clause, wherein to iterate the adjustments to the uplink transmit power comprises:

reducing a second transmit power by a predetermined amount, the second transmit power corresponding to a second bearer of the UE;

increasing the uplink transmit power by the predetermined amount, resulting in a new uplink transmit power, the uplink transmit power corresponding to a first bearer of the UE, the first bearer being different than the second bearer; and adjusting the new uplink transmit power based at least on an allowed tolerance corresponding to the new uplink transmit power.

16. The apparatus of any previous clause, wherein to iterate the adjustments to the uplink transmit power comprises:

modifying an uplink data split threshold to bias towards the first bearer, the uplink data split threshold indicating a data split ratio between the first bearer and the second bearer.

17. An apparatus of wireless communication at a UE of a mobile network, comprising means for performing one or more of the methods of any of the clauses 1-8.

18. A computer-readable medium storing instructions of wireless communication at a UE of a wireless communication network, executable by a processor, to perform one or more of the methods of any of the clauses 1-8.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) of a mobile network, comprising:

monitoring an uplink metric of an uplink transmission channel;

calculating an uplink transmit power based at least on a tolerance threshold;

transmitting, via the uplink transmission channel according to the uplink transmit power, an uplink transmission;

detecting a change in the uplink metric in response to transmitting the uplink transmission;

comparing the change in the uplink metric with performance improvement criteria;

determining, according to the comparing the change in the uplink metric with the performance improvement criteria, whether to adjust the uplink transmit power;

iterating adjustments to the uplink transmit power in response to determining to adjust the uplink transmit power; and stopping the adjustments to the uplink transmit power in response to determining that the uplink metric meets a performance threshold or in response to determining that the tolerance threshold has been met.

2. The method of claim 1, wherein the uplink metric comprises at least one of an uplink resource allocation and a block error rate.

3. The method of claim 1, wherein iterating the adjustments to the uplink transmit power comprises:

increasing the uplink transmit power by a predetermined amount.

4. The method of claim 1, wherein determining that the uplink metric meets the performance threshold comprises:

determining that the change in the uplink metric is less than a performance improvement threshold.

5. The method of claim 1, wherein iterating the adjustments to the uplink transmit power comprises:

calculating a new uplink transmit power based at least on a downlink reference signal received power (RSRP) imbalance across a plurality of downlink ports of the UE.

6. The method of claim 1, wherein iterating the adjustments to the uplink transmit power comprises:

calculating a new uplink transmit power based at least on an allowed tolerance corresponding to a current uplink transmit power.

7. The method of claim 1, wherein iterating the adjustments to the uplink transmit power comprises:
  reducing a second transmit power by a predetermined amount, the second transmit power corresponding to a second bearer of the UE;
  increasing the uplink transmit power by the predetermined amount, resulting in a new uplink transmit power, the uplink transmit power corresponding to a first bearer of the UE, the first bearer being different than the second bearer; and
  adjusting the new uplink transmit power based at least on an allowed tolerance corresponding to the new uplink transmit power.

8. The method of claim 7, wherein iterating the adjustments to the uplink transmit power further comprises:
  modifying an uplink data split threshold to bias towards the first bearer, the uplink data split threshold indicating a data split ratio between the first bearer and the second bearer.

9. An apparatus of wireless communication at a user equipment (UE) of a mobile network, comprising:
  a memory comprising instructions; and
  a processor communicatively coupled with the memory and configured to execute the instructions to:
    monitor an uplink metric of an uplink transmission channel;
    calculate an uplink transmit power based at least on a tolerance threshold;
    transmit, via the uplink transmission channel according to the uplink transmit power, an uplink transmission;
    detect a change in the uplink metric in response to transmitting the uplink transmission;
    compare the change in the uplink metric with performance improvement criteria;
    determine, according to the comparing the change in the uplink metric with the performance improvement criteria, whether to adjust the uplink transmit power;
    iterate adjustments to the uplink transmit power in response to determining to adjust the uplink transmit power; and
    stop the adjustments to the uplink transmit power in response to a determination that the uplink metric meets a performance threshold.

10. The apparatus of claim 9, wherein the uplink metric comprises at least one of an uplink resource allocation and a block error rate.

11. The apparatus of claim 9, wherein to iterate the adjustments to the uplink transmit power comprises:
  increasing the uplink transmit power by a predetermined amount.

12. The apparatus of claim 9, wherein the determination that the uplink metric meets the performance threshold comprises:
  determining that the change in the uplink metric is less than a performance improvement threshold.

13. The apparatus of claim 9, wherein to iterate the adjustments to the uplink transmit power comprises:
  calculating a new uplink transmit power based at least on a downlink reference signal received power (RSRP) imbalance across a plurality of downlink ports of the UE.

14. The apparatus of claim 9, wherein to iterate the adjustments to the uplink transmit power comprises:
  calculating a new uplink transmit power based at least on an allowed tolerance corresponding to a current uplink transmit power.

15. The apparatus of claim 9, wherein to iterate the adjustments to the uplink transmit power comprises:
  reducing a second transmit power by a predetermined amount, the second transmit power corresponding to a second bearer of the UE;
  increasing the uplink transmit power by the predetermined amount, resulting in a new uplink transmit power, the uplink transmit power corresponding to a first bearer of the UE, the first bearer being different than the second bearer; and
  adjusting the new uplink transmit power based at least on an allowed tolerance corresponding to the new uplink transmit power.

16. The apparatus of claim 15, wherein to iterate the adjustments to the uplink transmit power comprises:
  modifying an uplink data split threshold to bias towards the first bearer, the uplink data split threshold indicating a data split ratio between the first bearer and the second bearer.

17. An apparatus of wireless communication at a user equipment (UE) of a mobile network, comprising:
  means for monitoring an uplink metric of an uplink transmission channel;
  means for calculating an uplink transmit power based at least on a tolerance threshold;
  means for transmitting, via the uplink transmission channel according to the uplink transmit power, an uplink transmission;
  means for detecting a change in the uplink metric in response to transmitting the uplink transmission;
  means for comparing the change in the uplink metric with performance improvement criteria;
  means for determining, according to the comparing the change in the uplink metric with the performance improvement criteria, whether to adjust the uplink transmit power;
  means for iterating adjustments to the uplink transmit power in response to determining to adjust the uplink transmit power; and
  means for stopping the adjustments to the uplink transmit power in response to determining that the uplink metric meets a performance threshold or in response to determining that the tolerance threshold has been met.

18. The apparatus of claim 17, wherein the uplink metric comprises at least one of an uplink resource allocation and a block error rate.

19. The apparatus of claim 17, wherein the means for iterating the adjustments to the uplink transmit power comprises:
  means for increasing the uplink transmit power by a predetermined amount.

20. The apparatus of claim 17, wherein the means for determining that the uplink metric meets the performance threshold comprises:
  means for determining that the change in the uplink metric is less than a performance improvement threshold.

21. The apparatus of claim 17, wherein the means for iterating the adjustments to the uplink transmit power comprises:
  means for calculating a new uplink transmit power based at least on a downlink reference signal received power (RSRP) imbalance across a plurality of downlink ports of the UE.

22. The apparatus of claim 17, wherein the means for iterating the adjustments to the uplink transmit power comprises:

means for calculating a new uplink transmit power based at least on an allowed tolerance corresponding to a current uplink transmit power.

23. The apparatus of claim 17, wherein the means for iterating the adjustments to the uplink transmit power comprises:
   means for reducing a second transmit power by a predetermined amount, the second transmit power corresponding to a second bearer of the UE;
   means for increasing the uplink transmit power by the predetermined amount, resulting in a new uplink transmit power, the uplink transmit power corresponding to a first bearer of the UE, the first bearer being different than the second bearer;
   means for adjusting the new uplink transmit power based at least on an allowed tolerance corresponding to the new uplink transmit power; and
   means for modifying an uplink data split threshold to bias towards the first bearer, the uplink data split threshold indicating a data split ratio between the first bearer and the second bearer.

24. A non-transitory computer-readable medium storing instructions of wireless communication at a user equipment (UE) of a mobile network, executable by a processor to:
   monitor an uplink metric of an uplink transmission channel;
   calculate an uplink transmit power based at least on a tolerance threshold;
   transmit, via the uplink transmission channel according to the uplink transmit power, an uplink transmission;
   detect a change in the uplink metric in response to transmitting the uplink transmission;
   compare the change in the uplink metric with performance improvement criteria;
   determine, according to the comparing the change in the uplink metric with the performance improvement criteria, whether to adjust the uplink transmit power;
   iterate adjustments to the uplink transmit power in response to determining to adjust the uplink transmit power; and
   stop the adjustments to the uplink transmit power in response to a determination that the uplink metric meets a performance threshold.

25. The non-transitory computer-readable medium of claim 24, wherein the uplink metric comprises at least one of an uplink resource allocation and a block error rate.

26. The non-transitory computer-readable medium of claim 24, wherein to iterate the adjustments to the uplink transmit power comprises:
   increasing the uplink transmit power by a predetermined amount.

27. The non-transitory computer-readable medium of claim 24, wherein the determination that the uplink metric meets the performance threshold comprises:
   determining that the change in the uplink metric is less than a performance improvement threshold.

28. The non-transitory computer-readable medium of claim 24, wherein to iterate the adjustments to the uplink transmit power comprises:
   calculating a new uplink transmit power based at least on a downlink reference signal received power (RSRP) imbalance across a plurality of downlink ports of the UE.

29. The non-transitory computer-readable medium of claim 24, wherein to iterate the adjustments to the uplink transmit power comprises:
   calculating a new uplink transmit power based at least on an allowed tolerance corresponding to a current uplink transmit power.

30. The non-transitory computer-readable medium of claim 24, wherein to iterate the adjustments to the uplink transmit power comprises:
   reducing a second transmit power by a predetermined amount, the second transmit power corresponding to a second bearer of the UE;
   increasing the uplink transmit power by the predetermined amount, resulting in a new uplink transmit power, the uplink transmit power corresponding to a first bearer of the UE, the first bearer being different than the second bearer;
   adjusting the new uplink transmit power based at least on an allowed tolerance corresponding to the new uplink transmit power; and
   modifying an uplink data split threshold to bias towards the first bearer, the uplink data split threshold indicating a data split ratio between the first bearer and the second bearer.

* * * * *